(12) United States Patent
Navarro et al.

(10) Patent No.: US 10,967,769 B2
(45) Date of Patent: Apr. 6, 2021

(54) CLIP FOR FASTENING A SEAT COVER TO A FOAM PART OF A SEAT CUSHION, FOAMING TOOL, PRODUCTION ARRANGEMENT, AND METHOD FOR PRODUCING A FOAM PART OF A SEAT CUSHION

(71) Applicant: Adient Luxembourg Holding S.à.r.l., Luxembourg (LU)

(72) Inventors: Daniel Navarro, Haguenau (FR); Robert Braun, Daubensand (FR); Nicolas Mehl, Illkirch (FR); Salah Kechid, Illkirch (FR)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 511 days.

(21) Appl. No.: 15/744,336

(22) PCT Filed: Jul. 14, 2016

(86) PCT No.: PCT/EP2016/066793
§ 371 (c)(1),
(2) Date: Jan. 12, 2018

(87) PCT Pub. No.: WO2017/009425
PCT Pub. Date: Jan. 19, 2017

(65) Prior Publication Data
US 2018/0208091 A1 Jul. 26, 2018

(30) Foreign Application Priority Data

Jul. 14, 2015 (DE) ..................... 10 2015 213 166.2
Sep. 8, 2015 (DE) ..................... 10 2015 217 133.7
Jan. 21, 2016 (DE) ..................... 10 2016 200 841.1

(51) Int. Cl.
*B60N 2/58* (2006.01)
*B68G 7/12* (2006.01)
(Continued)

(52) U.S. Cl.
CPC .......... *B60N 2/5825* (2013.01); *A47C 31/023* (2013.01); *B25B 31/00* (2013.01);
(Continued)

(58) Field of Classification Search
CPC .. B60N 2/5825; B60N 2/6027; B60N 2/5841; B60N 2/6045; B60N 2/6833;
(Continued)

(56) References Cited

U.S. PATENT DOCUMENTS 8,347,472 B2    1/2013  Nanjo
2012/0174352 A1* 7/2012 Tsunoda ............... F16B 5/0642
                                                           24/530

(Continued)

FOREIGN PATENT DOCUMENTS

CN    103528312 A    1/2014
CN    103844634 A    6/2014
(Continued)

*Primary Examiner* — Stella K Yi
(74) *Attorney, Agent, or Firm* — Marshall & Melhorn, LLC

(57) ABSTRACT

A clip (1, 101, 201, 301) for securing a seat cover (304) to a foam part (303) of a seat cushion, including at least one securing element (1.2, 101.2, 201.2, 301.2, 1.6) for temporarily securing the clip (1, 101,201,301) to a foaming tool (SW) in a form-fitting manner. A foaming tool (SW) is provided for producing a foam part (303) of a seat cushion. A production arrangement (HS) is provided for producing a foam part (303) of a seat cushion, and a method is provided for producing a foam part (303) of a seat cushion.

11 Claims, 10 Drawing Sheets

(51) Int. Cl.
    *A47C 31/02*     (2006.01)
    *B25B 31/00*     (2006.01)
    *B29C 44/12*     (2006.01)
    *B60N 2/70*     (2006.01)
    *B29L 31/58*     (2006.01)

(52) U.S. Cl.
    CPC ............ *B29C 44/12* (2013.01); *B60N 2/5816* (2013.01); *B60N 2/5891* (2013.01); *B60N 2/7017* (2013.01); *B68G 7/12* (2013.01); *B29L 2031/58* (2013.01)

(58) Field of Classification Search
    CPC .. B60N 2/6036; B60N 2/5816; B60N 2/5891; B60N 2/7017; A47C 31/023; A47C 1/0325; B29C 44/12; B29C 2043/3411; B29C 70/541
    See application file for complete search history.

(56) References Cited

U.S. PATENT DOCUMENTS

2015/0033516 A1   2/2015  Saiga et al.
2015/0130255 A1*  5/2015  Kheil ................. B60N 2/70
                                            297/452.58
2015/0328808 A1*  11/2015  Sasaki ............. B29C 44/1271
                                              264/46.4

FOREIGN PATENT DOCUMENTS

| CN | 103917136 A | 7/2014 |
|---|---|---|
| CN | 103978917 A | 8/2014 |
| DE | 10 2014 011341 A1 | 2/2015 |
| EP | 2 075 093 A1 | 7/2009 |
| EP | 2 777 438 A1 | 9/2014 |
| WO | 2010/096933 A1 | 9/2010 |

\* cited by examiner

CLIP FOR FASTENING A SEAT COVER TO A FOAM PART OF A SEAT CUSHION, FOAMING TOOL, PRODUCTION ARRANGEMENT, AND METHOD FOR PRODUCING A FOAM PART OF A SEAT CUSHION

CROSS REFERENCE TO RELATED APPLICATIONS

This application is a U.S. National Phase Application of International Application PCT/EP2016/066793 filed Jul. 14, 2016 and claims the benefit of priority under 35 U.S.C. § 119 of German Application DE 10 2015 213 166.1 filed Jul. 14, 2015, German Application DE 10 2015 217 133.7 filed Sep. 8, 2015 and German Application DE 10 2016 200 841.2 filed Jan. 21, 2016, the entire contents of which are incorporated herein by reference.

FIELD OF THE INVENTION

The present invention relates to a clip for fastening a seat cover to a foam part of a seat cushion. The invention also relates to a foaming tool, to a production arrangement and to a method for producing a foam part of a seat cushion.

BACKGROUND OF THE INVENTION

Clips for fastening a seat cover to a foam part of a seat cushion are generally known from the prior art. These clips are foamed in place in the foam part of the seat cushion during production of the foam part. The seat cushion is then fastenable to the clips.

SUMMARY OF THE INVENTION

It is an object of the present invention to specify an improved clip for fastening a seat cover to a foam part of a seat cushion. It is also an object of the invention to specify an improved foaming tool, an improved production arrangement and an improved method for producing a foam part of a seat cushion.

The object is achieved according to the invention by a clip which is intended for fastening a seat cover on a foam part of a seat cushion and has the features of the present invention, by a foaming tool which is intended for producing a foam part of a seat cushion and has the features of the present invention, by a production arrangement which is intended for producing a foam part of a seat cushion and has the features of the present invention, and by a method which is intended for producing a foam part of a seat cushion and has the features of the present invention.

A clip according to the invention for fastening a seat cover to a foam part of a seat cushion, in particular of a seat cushion of a vehicle seat, comprises at least one fastening element for temporarily fastening the clip to a foaming tool by a form-fit connection. The clip is formed, for example, from plastics material.

A foaming tool according to the invention for producing the foam part of the seat cushion comprises at least one clip-receiving element for receiving such a clip, wherein the clip-receiving element has at least one retaining element, which corresponds to the fastening element of the clip. The foaming tool expediently comprises at least one mold, i.e. at least one cavity, which can be foam-filled with a material of the foam part which is to be produced, the foam part therefore being formed from the material, i.e. from a foam material.

A production arrangement according to the invention for producing the foam part of the seat cushion comprises the foaming tool and at least one above-described clip, which is fastened to the foaming tool by a form-fit connection.

The design of the clip and of the foaming tool, and thus of the production arrangement, gives rise to the advantages of the clip being straightforwardly and reliably fastenable to the foaming tool in a predetermined position, in which it is reliably retained by this fastening mechanism during production of the foam part, i.e. during the operation of foaming the latter in the foaming tool, and thus is partially foamed in place in the foam part in a predetermined manner. Following the operation of foaming the foam part, the clip can then be straightforwardly and reliably removed from the foaming tool together with the foam part, and this therefore avoids in particular detachment of the partially foamed-in-place clip from the foam part as the foam part is being removed from the foaming tool. The solution according to the invention reduces production time for the foam part, since the clip is easier and quicker to position in the foaming tool, there is a reduction in waste and in the reject rate during production of the foam part, and the straightforward operation of fastening the clip in the foaming tool reduces complexity of the foaming tool since other, significantly more complicated clip-fastening mechanisms are avoided.

In a method according to the invention for producing the foam part of the seat cushion, at least one such clip is fastened in the foaming tool by a form-fit connection, for example it is clipped into the clip-receiving element of the foaming tool. This means that the clip is positioned properly and retained in this position in the foaming tool. The foam part is then produced by a foaming operation in the foaming tool, wherein the at least one clip is partially foamed in place. In other words, the clip is partially encapsulated by material for forming the foam part, and so, once the foam part has hardened, part of the clip is arranged in the foam part and the clip is thus fastened on the foam part by a form-fit and/or a material-bonded connection. It is preferably the case that a plurality of clips are foamed in place in the foam part in this way. The resulting foam part with at least one foamed-in-place clip or a plurality of foamed-in-place clips is removed from the foaming tool following the foaming operation, expediently once the foamed material of the foam part has completely, or at least partially, hardened. The advantages arising from the method according to the invention have already been explained above. The advantages outlined there likewise apply to the method, since the method is implemented using the foaming tool according to the invention and using one or more clips according to the invention.

The at least one fastening element of the clip is designed, for example, in the form of a latching nose or in the form of a spring-hook nose. The at least one retaining element of the clip-receiving element, the retaining element corresponding to the fastening element of the clip, is designed, for example, in the form of a recess. This means that, as the clip is being inserted into the foaming tool, a latching connection is formed between the clip and the foaming tool by virtue of the latching nose or spring-hook nose latching into the corresponding recess, as a result of which the clip is reliably retained and precisely positioned. This latching-in action causes the clip to pull itself into its predetermined position. The precise positioning of the clip in the foaming tool and the subsequent production of the foam part by virtue of the foaming tool being filled with foam also ensure precise positioning, and a reliable and firm arrangement, of the then partially foamed-in-place clip in the foam part. In particular, incorrect foaming in place of the clip and therefore the risk of the clip being detached from the foam part are thus avoided.

The clip expediently comprises at least one receiving element for fastening the seat cover. This receiving element is designed, for example, in the form of an inner receiving element. For example a fastening element of the seat cover is hookable or clippable into the receiving element. For this purpose, the at least one receiving element is designed, for example, in the form of a hook. In another embodiment, the at least one receiving element is designed, for example, in the form of a bar, to which at least one seat-cover-fastening element designed in the form of a so-called hog ring is fastenable. Such a hog ring is an essentially ring-form staple or clamp which, in the circumference of the ring, has a through-opening which is intended for the through-passage of the bar and is then closable, for example by means of pliers, by virtue of the hog ring being pressed together.

In one possible embodiment, the at least one fastening element and the at least one receiving element for fastening the seat cover are directed away from one another. For example, the at least one fastening element is designed in the form of an outer fastening element, i.e. is oriented outward, for example in the direction of an outer peripheral region of the clip, and the receiving element for fastening the seat cover is directed away from the fastening element, and is therefore oriented inward. By use being made of at least one fastening element and of at least one receiving element, i.e. of two different elements, for fastening the clip to the foaming tool and for fastening the seat cover to the clip and, via the latter, to the foam part, it is possible for both the fastening element and the receiving element to be designed in accordance with their respective use purpose, in which case there is no need for any compromise solutions. For example, it is possible for the receiving element for fastening the seat cover to be designed so that the seat cover is retained in a permanently stable manner, for example to be designed in the form of a stable, relatively large hook, and for the fastening element to be designed in the form of a relatively small latching nose or a spring-hook nose, which allows easy clipping action into the foaming tool and easy removal, together with the foam part, from the foaming tool.

The clip comprises, for example, a panel-like region for fastening the clip in the foam part by a form-fit and/or a material-bonded connection by virtue of the panel-like region being foamed in place during production of the foam part. Therefore, during production of the foam part, the clip can be partially encapsulated by material for forming the foam part, and so, once the foam part has hardened, part of the clip is arranged in the foam part and the clip is thus fastened on the foam part by a form-fit and/or a material-bonded connection.

The advantages achieved by the invention consist, in particular, in that the clip is temporarily clippable into a precisely placed clip-receiving element in the foaming tool in a very straightforward and self-placing, in particular self-centering, manner, and this means that a foam part with a clip which is foamed in place in a precisely fitting manner can be straightforwardly produced.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
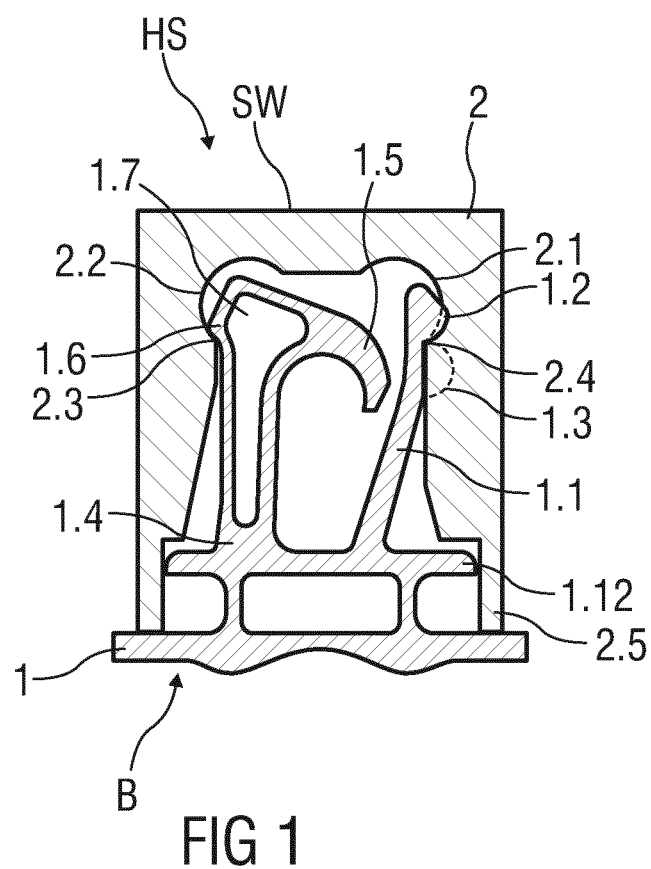
FIG. 1 is a sectional view of one embodiment of a clip clipped temporarily in a clip-receiving element.

Referring to the drawings, parts which correspond to one another have been provided with the same reference signs in all the figures.

FIG. 1 shows a sectional illustration of a first embodiment of a clip 1, only part of the clip 1 being illustrated. The clip 1 serves for fastening a seat cover 304 (not illustrated here) to a foam part 303 (not illustrated here either) of a seat cushion. The foam part 303 and seat cover 304 are illustrated, for example, in FIGS. 17 and 18 in relation to another exemplary embodiment. The clip 1 has been clipped temporarily into a clip-receiving element 2. The clip-receiving element 2 is insertable into a foaming tool SW, or has been inserted there. It is likewise possible and advantageous for the clip-receiving element 2 to be a fixed part of the foaming tool SW. Of the foaming tool SW, the figures illustrate only the clip-receiving element 2, 102, 202, 302. It is preferably the case that a number of clip-receiving elements 2 are inserted into the foaming tool SW prior to a foam part 303 of a seat cushion being produced in the foaming tool SW. Both the position of the number of clip-receiving elements 2 and the axial orientation thereof are, or have been, precisely predetermined here. The outer dimensions of the clip-receiving element 2 are preferably cylindrical. The clip-receiving element 2 is particularly preferably configured such that it is insertable into the foaming tool SW only in a defined axial orientation. It is possible for the clip-receiving element 2, for this purpose, to have at least one groove or at least one tongue, which corresponds with a corresponding configuration of the foaming tool SW.

The clip 1 has an elastic spring element 1.1, at the resilient end of which is arranged, on the outside, a latching nose 1.2 which forms a fastening element 1.2 and of which the position and shape correspond with those of a recess 2.1 in the form of a retaining element 2.1 on the clip-receiving element 2. Also arranged on the outside of the spring element 1.1 is a centering nose 1.3, which ensures that the clip 1 is introducible into the clip-receiving element 2, in a groove corresponding with the centering nose 1.3, only in a single predetermined axial orientation. The clip 1 has a likewise elastically resilient spring hook 1.4, at the end of which a hook 1.5, which is known per se, is arranged in an inwardly directed manner in the form of an receiving element 1.5 for fastening the seat cover 304. A spring-hook nose 1.6 is arranged in the form of a further fastening element 1.6 at the outer end of the spring hook 1.4 and is temporarily latchable into a further recess 2.2 in the form of a further retaining element 2.2 on the clip-receiving element 2 once a protrusion 2.3 has been negotiated. The protrusion 2.3 has located opposite, in the clip-receiving element 2, a further protrusion 2.4, the latching nose 1.2 being latchable into the recess 2.1 once it has negotiated the further protrusion 2.4.

Once the clip 1, in the manner illustrated, has been temporarily clipped into the clip-receiving element 2 in a precisely positioned and axially precisely oriented manner, and is thus precisely positioned in the foaming tool SW, a foam part 303 of a seat cushion is produced by a foaming operation, that region of the clip 1 which is illustrated at the bottom, in particular a panel-like region B, having been firmly foamed in place in the foam part. Once the foam part 303 has hardened, it can be removed, together with the foamed-in-place clip 1, from the foaming tool SW, the clip-receiving element 2 preferably remaining in the foaming tool SW.

For particularly precise centering and/or positioning of the clip 1 in the clip-receiving element 2, the clip 1 has, at a certain distance from that part of the clip 1 which is to be foamed in place, a plate 1.12, which has a cross-sectionally circular geometry. The external diameter of the plate 1.12 corresponds with the internal diameter of a collar 2.5 of the clip-receiving element 2. The collar 2.5 thus forms a sleeve-like end of the clip-receiving element 2.

Figure 2:
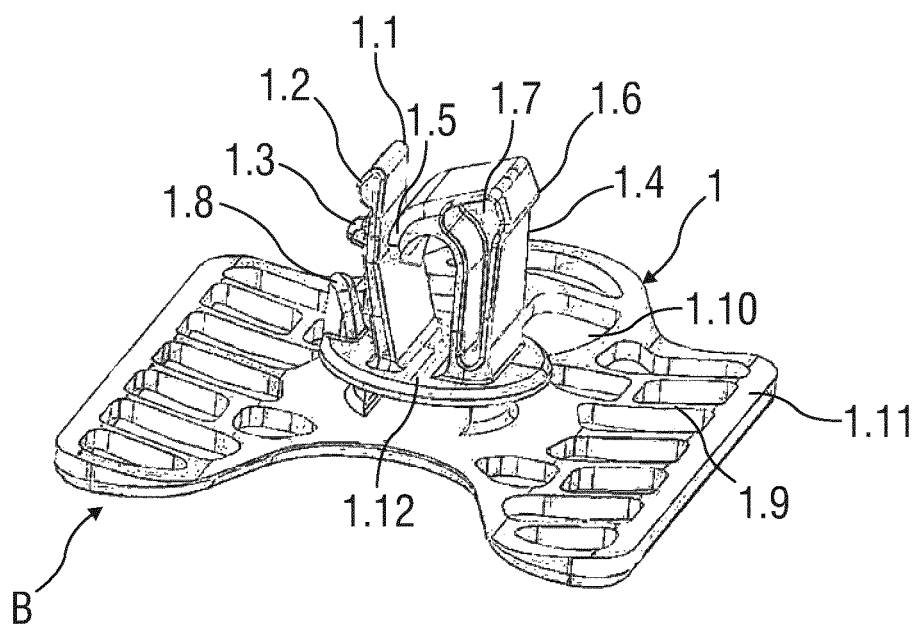
FIG. 2 is a perspective view of the embodiment of the clip according to FIG. 1.

FIG. 2 shows a full perspective view of the clip 1, only a portion of which is shown in the sectional illustration of FIG. 1. FIG. 2 illustrates that both the spring element 1.1 and the spring hook 1.4 are arranged on the plate 1.12. Also arranged on the plate 1.12 is a vertical centering element 1.8, by means of which the clip 1 is temporarily insertable into the clip-receiving element 2 (not illustrated here) only in a predetermined axial orientation, before the molding is foamed. The plate 1.12 also serves to seal the cavity of the clip-receiving element 2 during the foaming operation, and this means that, during the foaming operation, it is not possible for any foam to penetrate into the region of the spring element 1.1 and of the spring hook 1.4, these therefore being freely accessible once the molding has been demolded. The sealing is particularly effective if, in a state in which it has been inserted into the clip-receiving element 2, the plate 1.12 butts in planar fashion against an offset in the clip-receiving element 2, the offset being arranged coaxially in relation to the collar 2.5. The clip 1 is preferably designed such that the plate 1.12 is pressed axially against the offset in the clip-receiving element 2 by the spring force of the spring element 1.1. and of the spring hook 1.4, the sealing therefore being particularly reliable.

When it has been foamed in place in the foam part 303 illustrated, and is thus integrated therein, the clip 1 illustrated serves for the clip-fitting of fastening elements (not illustrated here) of a seat cover 304, preferably of wires with a diameter of 2 mm.

That region of the clip 1 which is to be foamed in place is a panel-like region B, which preferably has panel bars 1.9, between which panel apertures 1.10 are arranged. The panel bars 1.9 and the panel apertures 1.10 are surrounded by an all-round panel edge 1.11. The panel bars 1.9 and the panel apertures 1.10 serve, in a manner which is known per se, to establish a particularly fasten connection between the clip 1 and the foam part which is to be produced.

Figure 3:
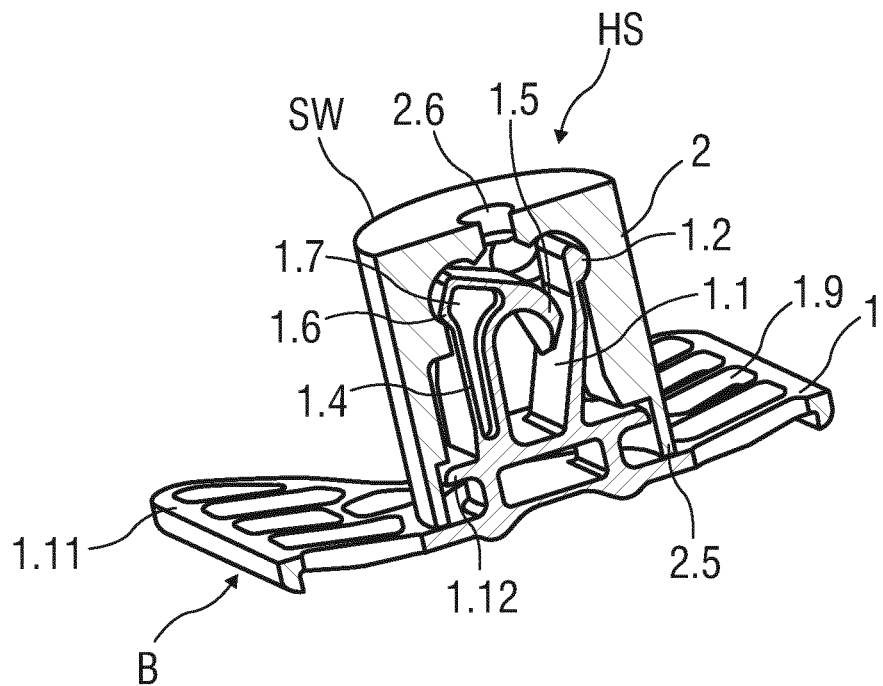
FIG. 3 is a perspective, sectional view of the embodiment of the clip according to FIG. 1 clipped in the clip-receiving element.

FIG. 3 shows a perspective, sectional illustration of the clip 1. At its foaming-tool end, that is to say the cylinder base, the clip-receiving element 2 has a central through-opening 2.6, by way of which the clip-receiving element 2 is fastenable, in particular screw-connectable, on the end side in a sleeve-like depression in the foaming tool SW, the depression corresponding with the outer shape of the clip-receiving element 2.

It is made possible for various prefabricated clip-receiving elements 2 to be introduced in defined, sleeve-like depressions in the surface of the foaming tool SW, this preferably taking place in that axial introduction of the clip-receiving element 2 is possible only in a certain axial orientation.

Figure 4:
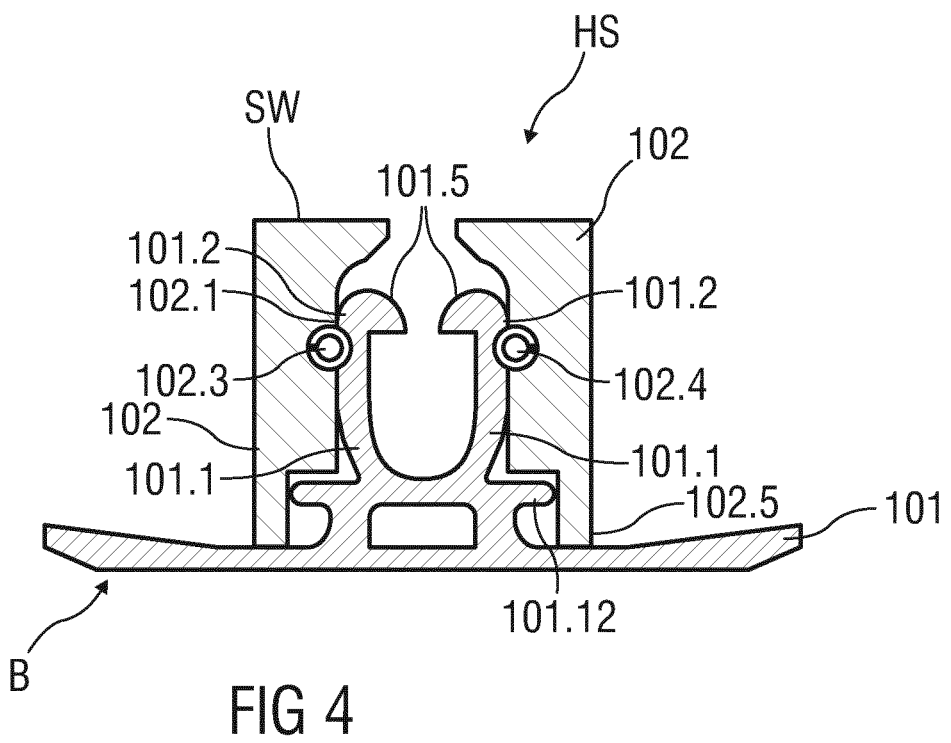
FIG. 4 is a sectional view of a further embodiment of a clip clipped temporarily in a clip-receiving element.
Figure 5:
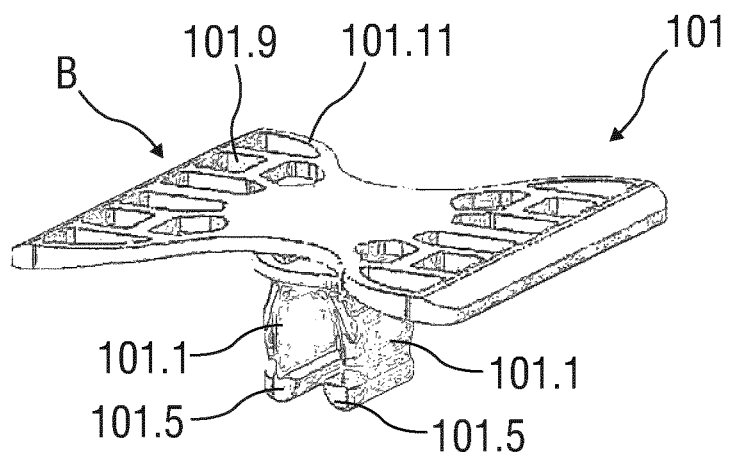
FIG. 5 is a perspective view of the embodiment of the clip according to FIG. 4.

FIG. 4 shows a sectional illustration of a second embodiment of a clip 101. The clip 101 has been temporarily clipped into a clip-receiving element 102. FIG. 5 shows a perspective illustration of the clip 101 without the clip-receiving element 102. The clip 101 has two opposite, symmetrical spring elements 101.1, which are each provided with an inwardly directed hook 101.5, in the form of an receiving element 101.5, which serves for subsequently fastening a fastening element of a seat cover 304 on the clip 101 when the latter has been foamed in place in the foam part 303. At the ends of the spring elements 101.1, the latter also each have arranged on their outside a latching nose 101.2, in the form of a fastening element 101.2, by means of which the clip 101 is clippable into corresponding retaining elements 102.1, designed in the form of recesses 102.1, once the latching noses 101.2 have negotiated protrusions 102.4 of the clip-receiving element 102. The protrusions 102.4 are preferably directed longitudinally, and oriented in a hose-like manner, it preferably being the case that the spring elements 101.1 have a planar, preferably rectangular cross section. This ensures that the clip 101 is insertable in merely a predetermined, axial orientation. In contrast to the clip 1, which is illustrated in FIGS. 1 to 3, the clip 101 is of mirror-symmetrical design. The spring elements 101.1 each have, on the outside, a horizontal groove, of which the shape and position correspond with those of the hose-like protrusions 102.4 of the clip-receiving element 102, it therefore being possible for the clip 101 to be temporarily clipped fastenly into the clip-receiving element 102. The clip 101 has a plate 101.12, of which the shape and function correspond with those of the plate 1.12, which is described in FIGS. 1 to 3. It is likewise the case that the clip-receiving element 102 has a collar 102.5, of which the shape and function correspond with those of the collar 2.5, which is described in FIGS. 1 to 3.

Figure 6:
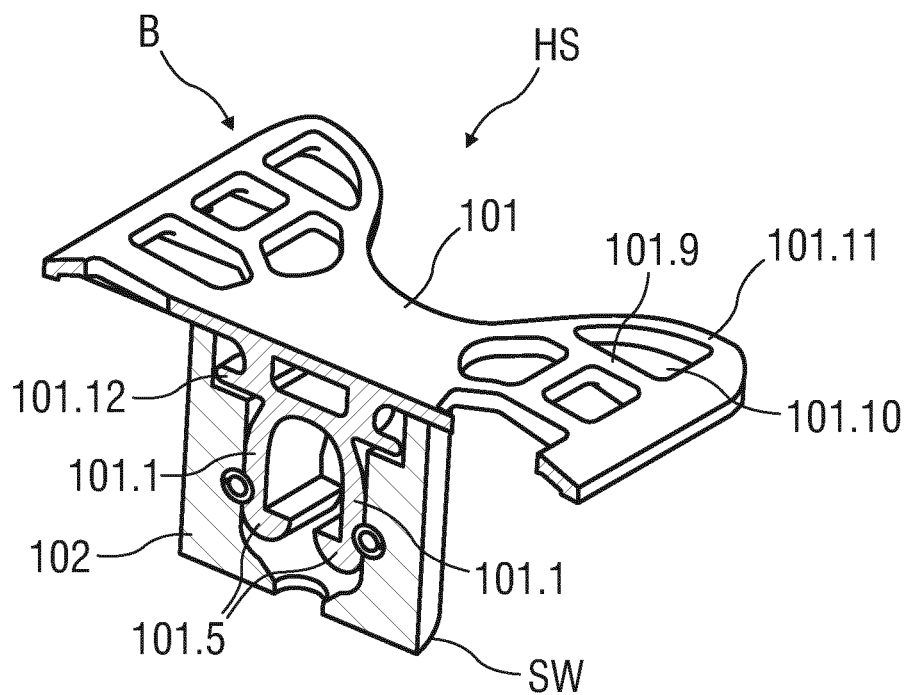
FIG. 6 is a perspective, sectional view of the embodiment of the clip according to FIG. 4 clipped in the clip-receiving element.

FIG. 6 shows an associated, perspective sectional illustration of the clip 101 clipped into the clip-receiving element 102. It can be seen here that that part of the clip 101 which is to be foamed in place has a number of panel bars 101.9 and panel apertures 101.10, which are surrounded by a panel edge 101.11.

Figure 7:
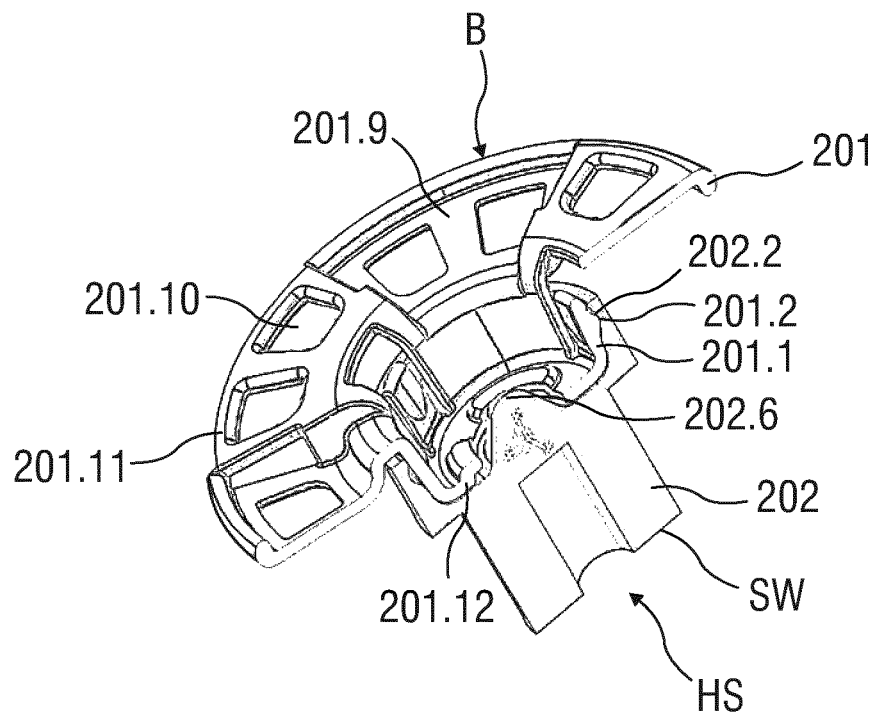
FIG. 7 is a perspective, sectional view of a further embodiment of a clip clipped temporarily in a clip-receiving element.

FIG. 7 shows a perspective, sectional illustration of a third embodiment of a clip 201, referred to as a bladder clip. The clip 201 is of essentially panel-like configuration, wherein that part of the clip 201 which is to be foamed in place is formed from panel bars 201.9, panel apertures 201.10 and a panel edge 201.11. The peripheral region of the panel-like region of the clip 201 which is to be foamed in place has portions which are alternately offset in height, which allows the clip 201 to be particularly effectively foamed in place in the foam part 303.

That region of the clip 201 which is temporarily clipped into the clip-receiving element 202 is of more or less sleeve-like configuration, wherein a plate 201.12 has arranged on it a number of spring elements 201.1 which are of radially resilient design. The spring elements 201.1 each have arranged on the outer sides a latching nose 201.2, in the form of a fastening element 201.2, which is temporarily clippable into corresponding retaining elements 202.2 of the clip-receiving element 202, the retaining elements being designed in the form of recesses 202.2.

The clip-receiving element 202 has a central centering elevation 202.6 which, for the purpose of centering the clip 201, engages in a circular, central aperture in the plate 201.12.

Figure 8:
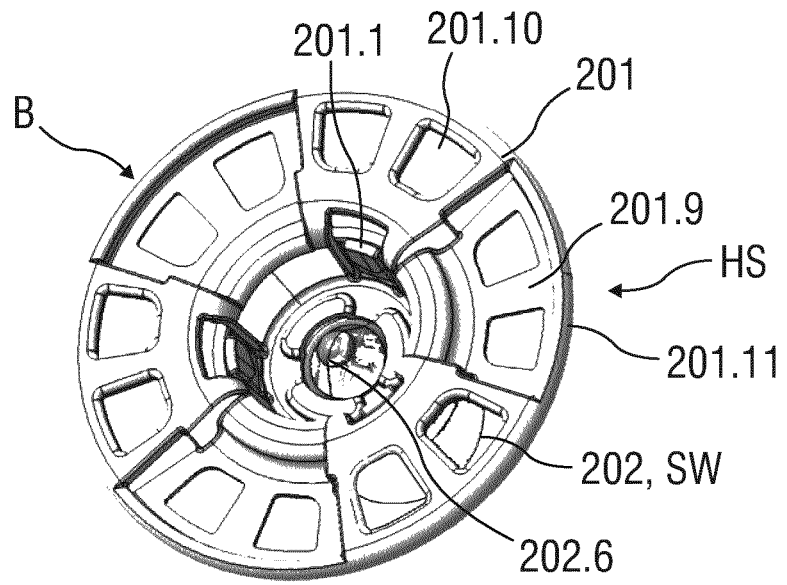
FIG. 8 is a perspective view of the embodiment of the clip according to FIG. 7 clipped in the clip-receiving element.

FIG. 8 shows a complete perspective view of the clip 201, which has three spring elements 201.1.

Figure 9:
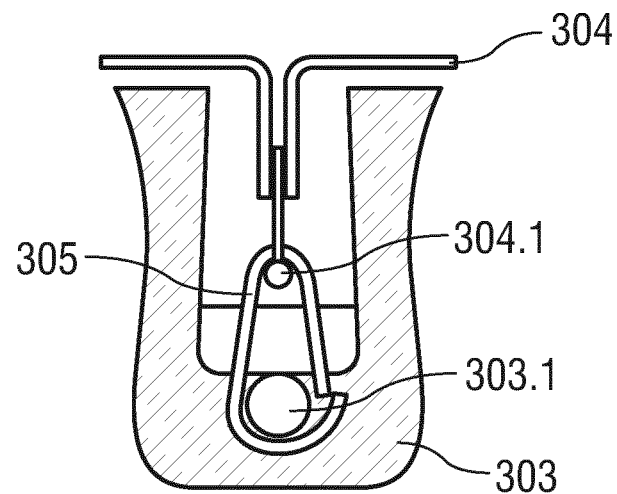
FIG. 9 is a sectional view of a mechanism for fastening a seat cover to a foam part according to the prior art.

FIG. 9 shows a schematic section of a mechanism for fastening a seat cover 304 on a foam part 303 according to the prior art. The foam part 303 is a constituent part of a seat cushion for a vehicle seat. A metal wire 303.1 has been partially foamed in place in the foam part 303, to be precise such that its ends have been foamed in place and a central region has not. The metal wire 303.1 serves for fastening a seat cover 304, on the underside of which is arranged a wire 304.1 in the form of a fastening element. The wire 304.1 is produced preferably from metal. The wire 304.1 is connected to the metal wire 303.1 by means of a hog ring 305, the seat cover 304 therefore being fastened on the foam part 303. The hog ring 305 here is arranged in the central region of the metal wire 303.1, that is to say the region which has not been foamed in place. The hog ring 305 is preferably a closed staple, which consists particularly preferably of metal or plastics material.

Figure 10:
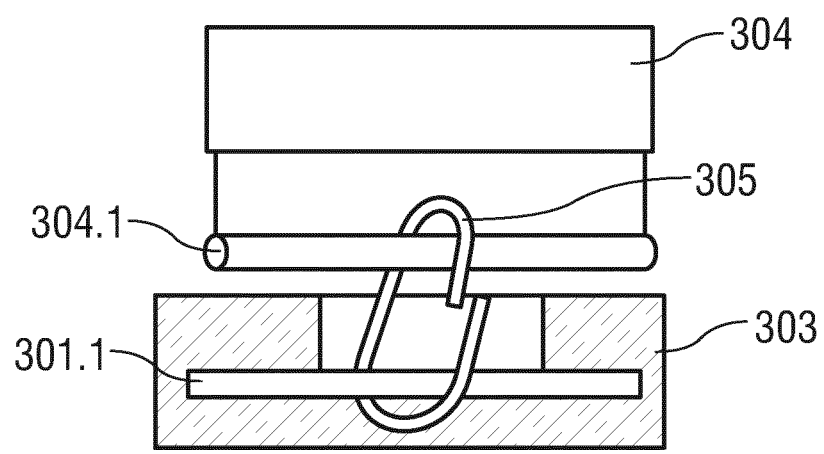
FIG. 10 is a further sectional view of the mechanism for fastening a seat cover to a foam part according to the prior art in FIG. 9.

FIG. 10 shows a further schematic section of the same mechanism for fastening a seat cover 304 on the foam part 303 according to the prior art. The section plane here has been rotated through 90° in relation to the section plane of FIG. 9.

Figure 11:
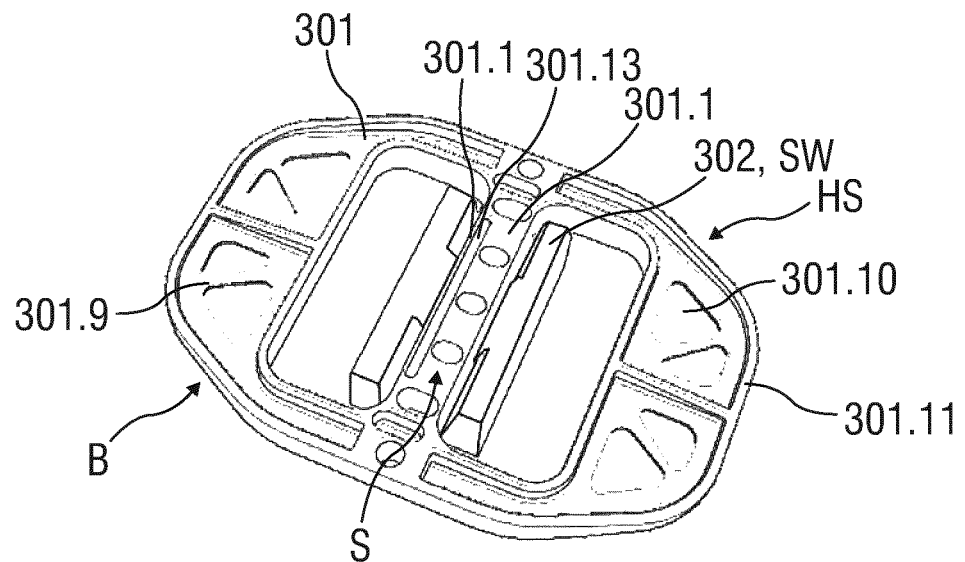
FIG. 11 is a perspective view of a further embodiment of a clip clipped temporarily in a clip-receiving element.

FIG. 11 shows a sectional illustration of an embodiment of a clip 301. The clip 301 serves for fastening the seat cover 304 (not illustrated here) to the foam part 303 (not illustrated here either) of the seat cushion. The clip 301 has been clipped temporarily into a clip-receiving element 302. The clip-receiving element 302 is insertable into a foaming tool SW (not illustrated), or has been inserted there, i.e. of the foaming tool SW, only the clip-receiving element 302 is illustrated here. It is likewise possible for the clip-receiving element 302 to be a fixed part of the foaming tool. It is preferably the case that a number of clip-receiving elements 302 are inserted into the foaming tool SW prior to a foam part 303 of a seat cushion being produced in the foaming tool SW. Both the position of the number of clip-receiving elements 302 and the axial orientation thereof are, or have been, precisely predetermined here. The outer dimensions of the clip-receiving element 302 are preferably cuboidal. As a result, the clip-receiving element 302 is particularly preferably configured such that it is insertable into the foaming tool SW in the axial direction only in two defined positions. The outer shape of the clip-receiving element 302 corresponds with a corresponding configuration of the foaming tool SW and is fixable in the latter.

The clip 301 has a central bar S forming an receiving element S for fastening the seat cover 304, which bar is not to be foamed in place and is formed from two parallel elastic spring elements 301.1. The two spring elements 301.1 are spaced apart from one another by a slot 301.13. Since the clip 301 is formed from plastics material, the bar S is particularly flexible, wherein the spring element 301.1 shown on the left has a significantly smaller width than the spring element 301.1 shown on the right, as a result of which the flexibility of the bar S is achieved essentially by the deformability of the spring element 301.1 shown on the left. The significantly thicker spring element 301.1, which is shown on the right, is particularly stable, so as to retain the seat cover 304 in a reliable manner. In other words, its spring action is at a relatively low level or tends essentially toward zero, in which case it is an essentially rigid and stiff bar element. The operations of clip-fitting the clip 301 and of removing the same then take place essentially by deformation of the significantly thinner and significantly more flexible spring element 301.1, which is shown on the left.

The right-hand outer edge of the spring element 301.1 shown on the right and the left-hand edge of the spring element 301.1 shown on the left each have arranged or formed on them a prismatic latching nose 301.2 (not shown here), in the form of a fastening element 301.2, of which the position and shape correspond with those of a respective retaining element 302.1 (not shown here either) of the clip-receiving element 302, the retaining element 302.1 being designed in the form of a recess 302.1. This correspondence will be explained in more detail in FIG. 14. This correspondence ensures that the clip 301 is introducible into the clip-receiving element 302 only in a single predetermined axial orientation.

Once the clip 301, in the manner illustrated, has been temporarily clipped into the clip-receiving element 302 in a precisely positioned and axially precisely oriented manner, and is thus precisely positioned in the foaming tool SW, a foam part 303 of a seat cushion is produced by a foaming operation, those regions of the clip 301 that are illustrated on the right and left having been firmly foamed in place in the foam part. Once the foam part 303 has been hardened, it can be removed, together with the foamed-in-place clip 301, from the foaming tool SW, the clip-receiving element 302 preferably remaining in the foaming tool SW.

Figure 12:
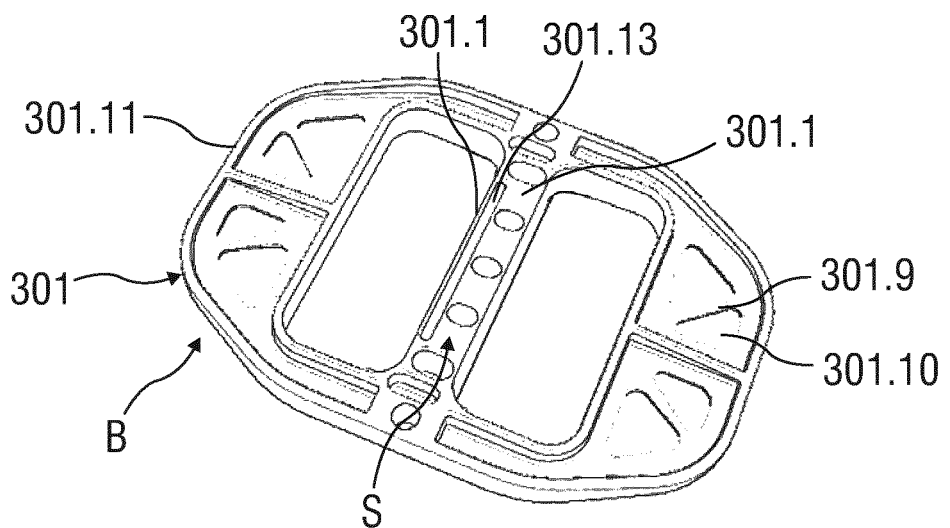
FIG. 12 is a perspective view of the embodiment of the clip according to FIG. 11.

FIG. 12 shows a complete perspective view of the clip 301 shown in FIG. 11, this time without the clip-receiving element 302. When it has been foamed in place in the foam part 303 (not illustrated), and is thus integrated therein, the clip 301 illustrated serves for receiving hog rings 305 (not illustrated here) for fastening a seat cover 304 (not illustrated here). One or more hog rings 305 are fastened here on the bar S.

Two regions of the clip 301 which are to be foamed in place, and will be explained in more detail in FIG. 16, preferably have panel bars 301.9, between which panel apertures 301.10 are arranged. The panel bars 301.9 and the panel apertures 301.10 are surrounded by an all-round panel edge 301.11. The panel bars 301.9 and the panel apertures 301.10 serve, in a manner which is known per se, to establish a particularly fasten connection between the clip 301 and the foam part 303 which is to be produced.

Figure 13:
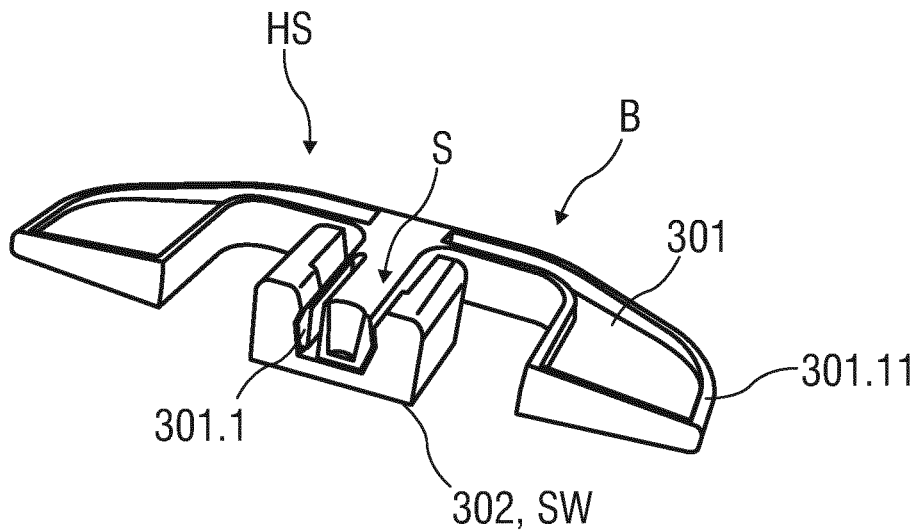
FIG. 13 is a perspective, sectional view of the embodiment of the clip according to FIG. 11 along with the clip-receiving element.

FIG. 13 shows a perspective, sectional illustration of the clip 301. At its foaming-tool end, the clip-receiving element 302 has a rectangular surface area, by way of which the clip-receiving element 302 is fixable, in particular screw-connectable or clampable, in a cuboidal depression in the foaming tool SW, the depression corresponding with the outer shape of the clip-receiving element 302.

It is made possible for various prefabricated clip-receiving elements 302 to be introduced in defined depressions in the surface of the foaming tool, this preferably taking place in that axial introduction of the clip-receiving element 302 is possible only in a certain axial orientation. In one possible embodiment, the mirror-symmetrical design of the clip-receiving element 302 means that the position of the latter can be rotated through 180° about the vertical axis in order to achieve the same axial orientation. It is likewise possible for the position of the clip-receiving element 302 to be rotated through 180° about the longitudinal axis, in order to achieve the same axial orientation.

The mirror-symmetrical design of the clip 301 means that the position of the latter can be rotated through 180° about the vertical axis in order to achieve the same axial orientation. It is likewise possible for the position of the clip 301 to be rotated through 180° about the longitudinal axis, in order to achieve the same axial orientation. This means that four different positions are possible for the insertion of the clip 301 into the clip-receiving element 302, and therefore, upon insertion, the clip 301 can be positioned particularly straightforwardly and with a low probability of error.

Figure 14:
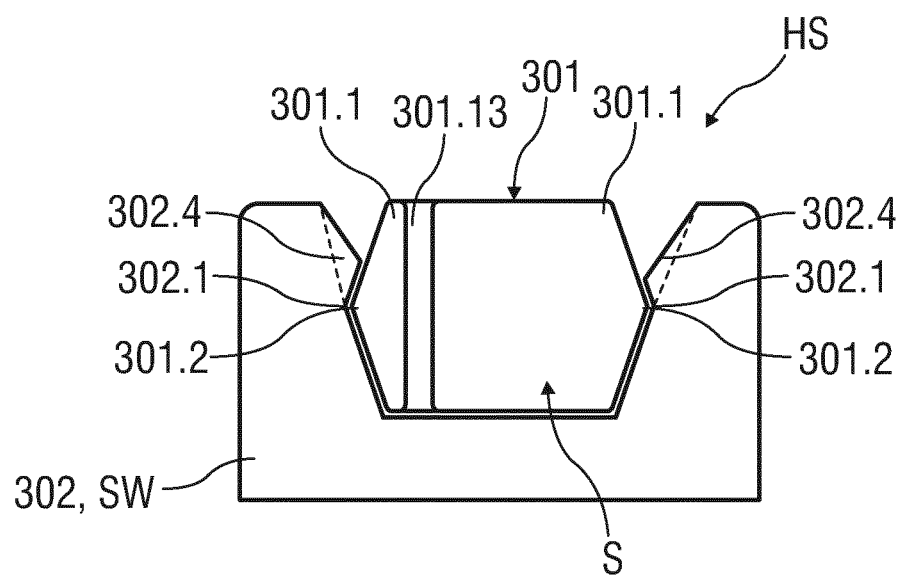
FIG. 14 is a schematic sectional view of the embodiment of the clip along with the clip-receiving element according to FIG. 11.

FIG. 14 shows a schematic sectional illustration of a portion of the clip 301 with clip-receiving element 302. Each of the two spring elements 301.1 have, on the outside, a respective prismatic latching nose 301.2, which is temporarily latchable into a depression 302.1 of the clip-receiving element 302 once a protrusion 302.4 of the clip-receiving element 302 has been negotiated. The clip-receiving element 302 is of mirror-symmetrical design. When the clip 301 is clipped in, its parallel spring elements 301.1 are pushed toward one another, or at least the thinner spring element 301.1 is pushed toward the other, thicker spring element 301.1, wherein there is a reduction in the width of the slot 301.13, and thus in the width of the bar S, and the clip 301 can therefore be clipped in.

Figure 15:
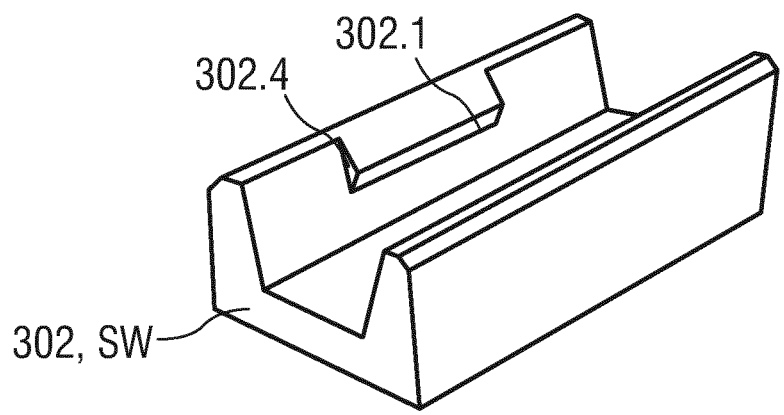
FIG. 15 is a schematic, perspective view of the embodiment of the clip-receiving element according to FIG. 14.

FIG. 15 shows a perspective illustration of the clip-receiving element 302, which is essentially of channel form, wherein two opposite inner planar walls run conically, and therefore the inner width of the channel decreases in the downward direction. The respective prismatic protrusion 302.4, which has an upper and a lower essentially planar surface, is arranged on each lateral wall. The above-described recess 302.1 is formed by the respectively lower surface of the protrusion 302.4 and the corresponding inner wall of the channel.

Figure 16:
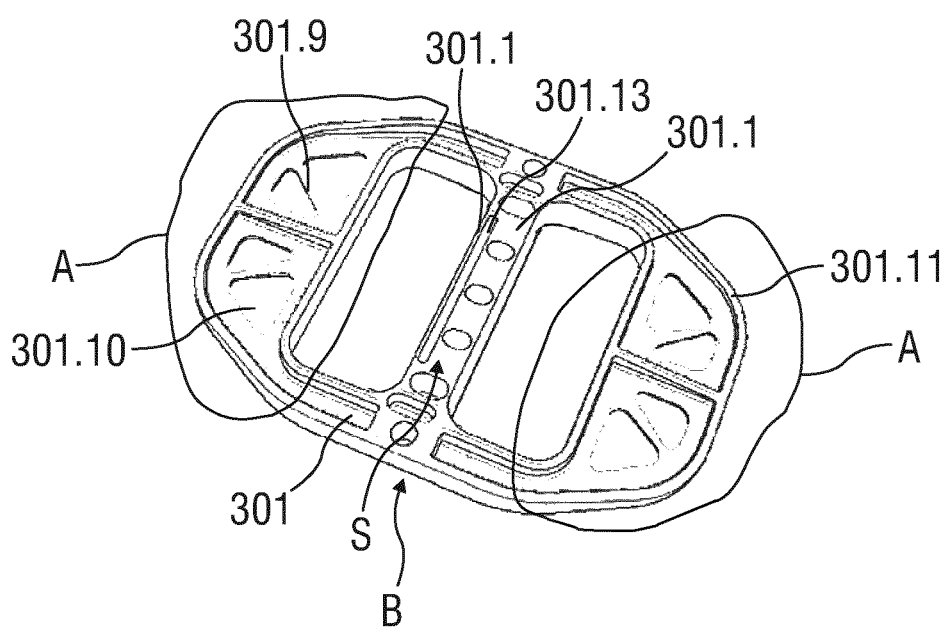
FIG. 16 is a further perspective view of the embodiment of the clip according to FIG. 11.

FIG. 16 shows a perspective illustration of the clip 301, including those two panel sub-regions A of the clip which are to be foamed in place. The bar S, which is formed from the two parallel spring elements 301.1, which are spaced apart by the slot 301.13, is not also foamed in place.

Figure 17:
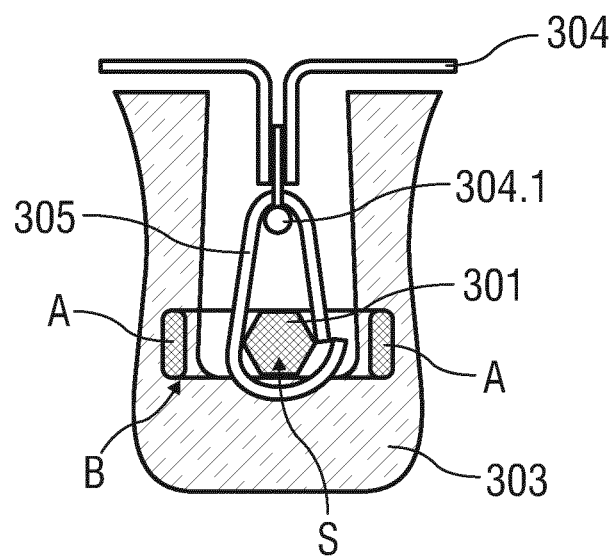
FIG. 17 is a schematic, sectional view of the embodiment of the clip according to FIG. 11 with the seat cover fastened thereto.
Figure 18:
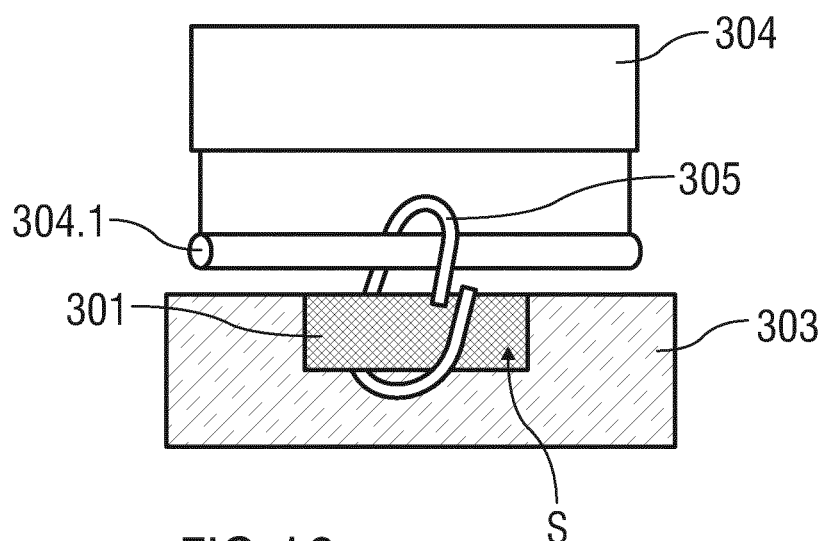
FIG. 18 is a further schematic, sectional view of the embodiment of the clip according to FIG. 11 with the seat cover fastened thereto.

FIGS. 17 and 18 show two simplified, schematic sectional illustrations of a portion of a foam part 303, in which a clip 301 has been partially foamed in place. The two panel sub-regions A have been foamed in place here, and the bar S of the clip 301 has not been foamed in place. The seat cover 304 is connected to the foam part 303 in that a wire 304.1, which is connected to the seat cover 304, is connected by means of a hog ring 305 to the bar S, which serves as a receiving element S for fastening the seat cover 304, which in turn is connected to the foam part 303. The wire 304.1 and the bar S preferably run essentially parallel to one another.

In all the exemplary embodiments illustrated, the foaming tool SW and at least one clip 1, 101, 201, 301, which is fastened thereto by a form-fit connection, form a production arrangement HS for producing a foam part 303 of a seat cushion.

The exemplary embodiments illustrated of the clip 1, 101, 201, 301 each have a panel-like region B, which is foamed in place in the foam part 303 while the foam part 303 is being produced, and therefore the clip 1, 101, 201, 301 is then connected to the foam part 303 by a form-fit and/or a material-bonded connection.

Figure 19:
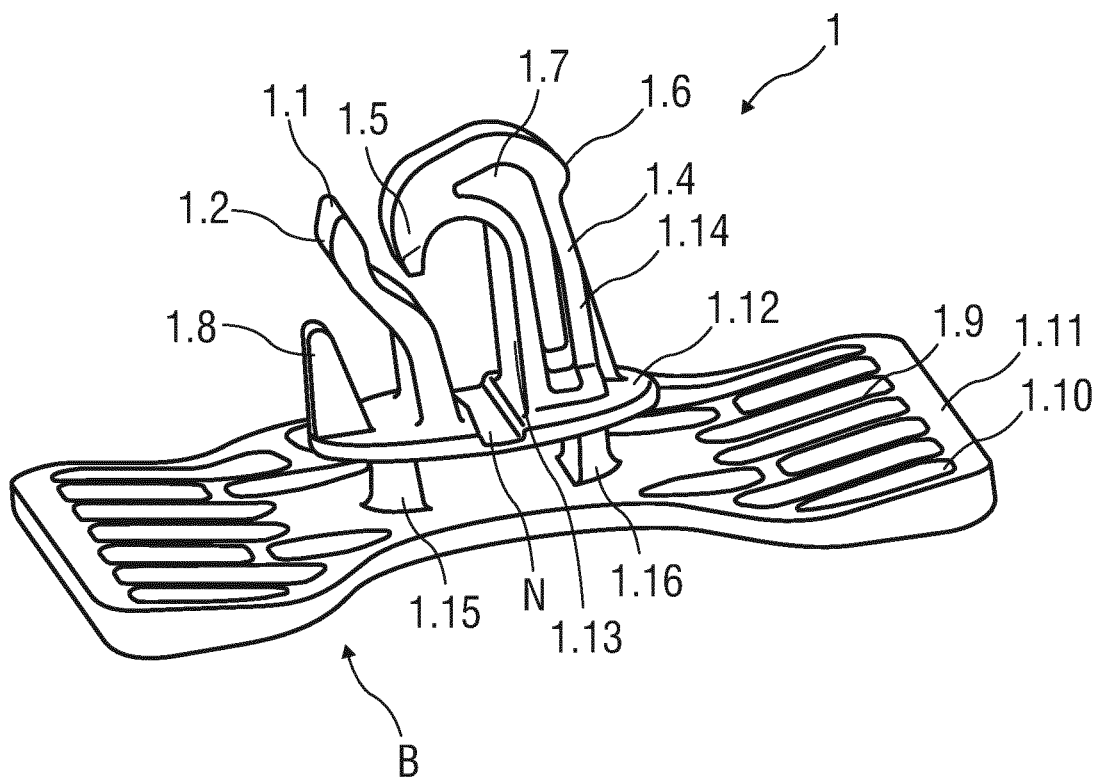
FIG. 19 is a perspective view of a further embodiment of the clip.
Figure 20:
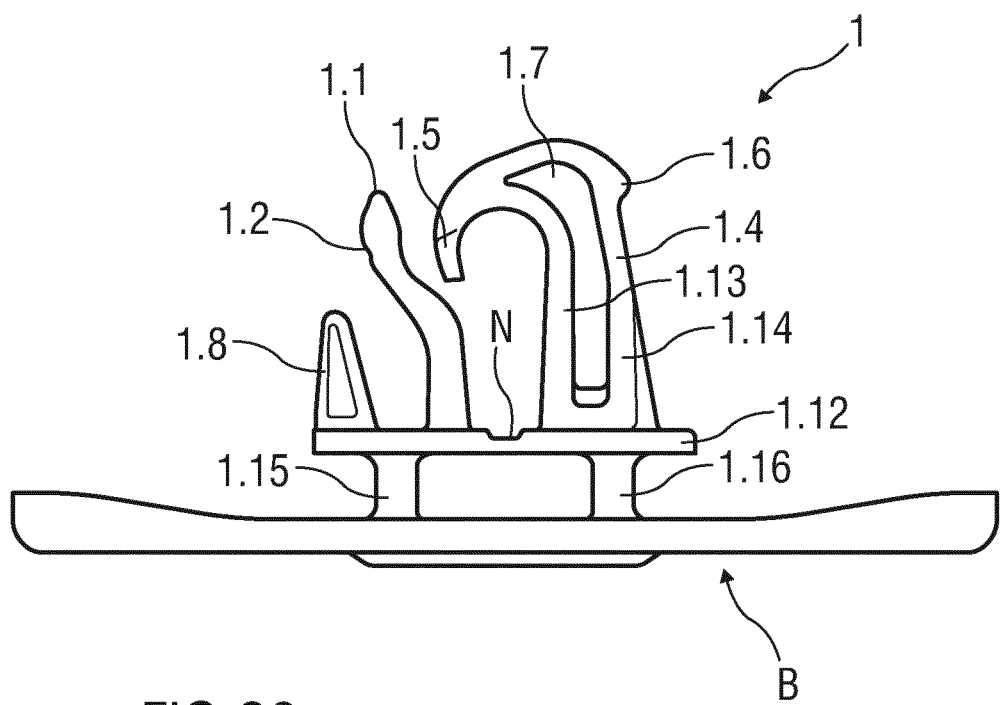
FIG. 20 is a side view of the embodiment of the clip according to FIG. 19.

FIGS. 19 and 20 show a further embodiment of the clip 1, this embodiment illustrating a modification to that embodiment of the clip 1 which is illustrated in FIGS. 1 to 3. The clip 1 is shown in a perspective view in FIG. 19 and in a side view in FIG. 20. The clip 1 has the elastic spring element 1.1, at the resilient end of which is arranged, on the outside, the latching nose 1.2 which is in the form of a fastening element 1.2 and of which the position and shape correspond to those of the recess 2.1 in the form of a retaining element 2.1 on the clip-receiving element 2. The centering nose 1.3 is not provided here on the outside of the spring element 1.1, but may be present in other embodiments of the clip 1, also together with the other features of that embodiment of the clip 1 which is illustrated in FIGS. 19 and 20.

The clip 1 has the likewise elastically resilient spring hook 1.4, at the end of which the hook 1.5, which is known per se, is arranged in an inwardly directed manner in the form of an receiving element 1.5 for fastening the seat cover 304. The spring-hook nose 1.6 is arranged in the form of a further fastening element 1.6 at the outer end of the spring hook 1.4 and is temporarily latchable into the further recess 2.2 in the form of a further retaining element 2.2 on the clip-receiving element 2 once the protrusion 2.3 has been negotiated. As already described in relation to the exemplary embodiment according to FIGS. 1 to 3, the protrusion 2.3 has located opposite it, in the clip-receiving element 2, the further protrusion 2.4, the latching nose 1.2 being latchable into the recess 2.1 once it has negotiated the further protrusion 2.4. Furthermore, the spring hook 1.4 has a cross-sectional weakening 1.7, for example in the form of a recess, in order to increase, for example, elasticity of the spring hook 1.4. In the embodiment of FIGS. 1 to 3, it is likewise possible for the spring hook 1.4 to have such a cross-sectional weakening 1.7.

Once the clip 1 has been temporarily clipped into the clip-receiving element 2, and is thus precisely positioned in the foaming tool SW, the foam part 303 of the seat cushion is produced by a foaming operation, that region of the clip 1 which is illustrated at the bottom, in particular the panel-like region B, having been firmly foamed in place in the foam part. Once the foam part 303 has hardened, it can be removed, together with the foamed-in-place clip 1, from the foaming tool SW, the clip-receiving element 2 preferably remaining in the foaming tool SW.

For particularly precise centering and/or positioning of the clip 1 in the clip-receiving element 2, the clip 1 has, at a certain distance from that part of the clip 1 which is to be foamed in place, the plate 1.12, which has a cross-sectionally circular or oval geometry. It is also possible for the plate 1.12 of the exemplary embodiment which is illustrated in FIGS. 1 to 3 to have this oval geometry. The external diameter and/or the outer circumferential shape of the plate 1.12 correspond/corresponds with the internal diameter or the inner circumferential shape of the collar 2.5 of the clip-receiving element 2. The collar 2.5 thus forms a sleeve-like end of the clip-receiving element 2.

As illustrated in FIGS. 19 and 20, both the spring element 1.1 and the spring hook 1.4 are arranged on the plate 1.12. In a central region arranged between the spring element 1.1 and the spring hook 1.4, the plate 1.12 has a groove N, i.e. the plate 1.12 has a reduction in thickness. Also arranged on the plate 1.12 is a vertical centering element 1.8, by means of which the clip 1 is temporarily insertable into the clip-receiving element 2 (not illustrated here) only in a predetermined axial orientation, before the molding is foamed.

The plate 1.12 also serves to seal the cavity of the clip-receiving element 2 during the foaming operation, and this means that, during the foaming operation, it is not possible for any foam to penetrate into the region of the spring element 1.1 and of the spring hook 1.4, these therefore being freely accessible once the molding has been demolded. The sealing is particularly effective if, in the state in which it has been inserted into the clip-receiving element 2, the plate 1.12 butts in planar fashion against the offset in the clip-receiving element 2, the offset being arranged coaxially in relation to the collar 2.5. The clip 1 is preferably designed such that the plate 1.12 is pressed axially against the offset in the clip-receiving element 2 by the spring force of the spring element 1.1. and of the spring hook 1.4, the sealing therefore being particularly reliable.

When it has been foamed in place in the foam part 303, and is thus integrated therein, the clip 1 illustrated serves for the clip-fitting of fastening elements of a seat cover 304, preferably of wires with a diameter of 2 mm.

That region of the clip 1 which is to be foamed in place is a panel-like region B, which preferably has panel bars 1.9, between which panel apertures 1.10 are arranged. The panel bars 1.9 and the panel apertures 1.10 are surrounded by the all-round panel edge 1.11. The panel bars 1.9 and the panel apertures 1.10 serve, in a manner which is known per se, to establish a particularly fasten connection between the clip 1 and the foam part which is to be produced.

It is an advantage of the clip 1 that the spring hook 1.4, which has the receiving element 1.5 in the form of a hook 1.5 for fastening the seat cover 304, is fastened to the plate 1.12 via expediently two material bars 1.13, 1.14. If one of the material bars 1.13, 1.14 breaks, for example under excessive loading, the other material bar 1.14, 1.13 in each case prevents the situation where the receiving element 1.5, in the form of a hook 1.5, becomes completely detached from the clip 1 and for example moves in an uncontrolled manner in the vehicle.

It is likewise the case that the plate 1.12 is expediently connected to the panel-like region B by means of two legs 1.15, 1.16. This means that, in the event of one of the legs 1.15, 1.16 breaking, for example on account of excessive loading, the other leg 1.16, 1.15 prevents the upper region of the clip from becoming completely detached from the panel-like region B, and this prevents uncontrolled movement of separated-off clip parts in the vehicle. The groove N and/or the legs 1.15, 1.6 and/or the material bars 1.13, 1.14 can also be provided in that embodiment of the clip 1 which is illustrated in FIGS. 1 to 3.

While specific embodiments of the invention have been shown and described in detail to illustrate the application of the principles of the invention, it will be understood that the invention may be embodied otherwise without departing from such principles.

The invention claimed is:

1. A clip for fastening a seat cover to a foam part of a seat cushion, the clip comprising:
   at least one fastening element for temporarily fastening the clip on a foaming tool by a form-fit connection,
   wherein said at least one fastening element has a first portion with a lower portion comprising two spaced apart bars and an upper portion comprising a spring-hook nose on an outer surface and a hook on an opposite inner surface,
   wherein a spring element is angled away from said first portion, wherein said spring element has an inner surface and an opposite outer surface, the inner surface consisting essentially of a lower planar surface and an upper planar surface, and the outer surface having latching nose.

2. The clip as claimed in claim 1, further comprising at least one receiving element for fastening the seat cover.

3. The clip as claimed in claim 2, wherein the at least one receiving element comprises one of a hook and a bar.

4. The clip as claimed in claim 2, wherein the at least one fastening element and the at least one receiving element are directed away from one another.

5. A production arrangement for producing a foam part of a seat cushion, the production arrangement comprising:
   a foaming tool and at least one clip, the at least one clip being fastened to the foaming tool by a form-fit connection, the foaming tool comprising at least one clip-receiving element for receiving the at least one clip, the at least one clip comprising at least one fastening element for temporarily fastening the at least one clip on the foaming tool by the form-fit connection,
   wherein the at least one clip-receiving element has at least one retaining element, which corresponds to the at least one fastening element of the at least one clip,
   wherein said at least one clip has a first portion with a lower portion comprising two spaced apart bars and an upper portion comprising a spring-hook nose on an outer surface and a hook on an opposite inner surface,
   wherein a spring element is angled away from said first portion, wherein said spring element has an inner surface and an opposite outer surface, the inner surface consisting essentially of a lower planar surface and an upper planar surface, and the outer surface having latching nose.

6. A method for producing a foam part of a seat cushion, the method comprising:

fastening at least one clip in a foaming tool by a form-fit connection and then producing the foam part by a foaming operation in the foaming tool, wherein the at least one clip is partially foamed in place, the foaming tool comprising at least one clip-receiving element for receiving the at least one clip, the at least one clip comprising at least one fastening element for temporarily fastening the at least one clip on the foaming tool by the form-fit connection wherein the at least one clip-receiving element has at least one retaining element, which corresponds to the at least one fastening element of the at least one clip, wherein said at least one clip has a first portion with a lower portion comprising two spaced apart bars and an upper portion comprising a spring-hook nose on an outer surface and a hook on an opposite inner surface, wherein a spring element is angled away from said first portion, wherein said spring element has an inner surface and an opposite outer surface, the inner surface consisting essentially of a lower planar surface and an upper planar surface, and the outer surface having latching nose.

7. The method as claimed in claim 6, wherein the at least one receiving element fastens a seat cover.

8. The method as claimed in claim 6, wherein the at least one receiving element comprises one of a hook and a bar.

9. The method as claimed in claim 6, wherein the at least one fastening element and the at least one receiving element are directed away from one another.

10. The production arrangement as claimed in claim 5, wherein the at least one retaining element of the at least one clip-receiving element comprises a recess.

11. The clip as claimed in claim 1, further comprising a panel-like region for fastening the clip in the foam part by a form-fit connection and/or a material-bonded connection by the panel-like region being foamed in place during production of the foam part, wherein the panel-like region has panel bars, between which panel apertures are arranged, and wherein the panel bars and the panel apertures are surrounded by an all-round panel edge.

* * * * *